Aug. 18, 1953  J. G. STEIN  2,649,268
TRIPOD MOUNTING
Filed March 4, 1949  3 Sheets-Sheet 1
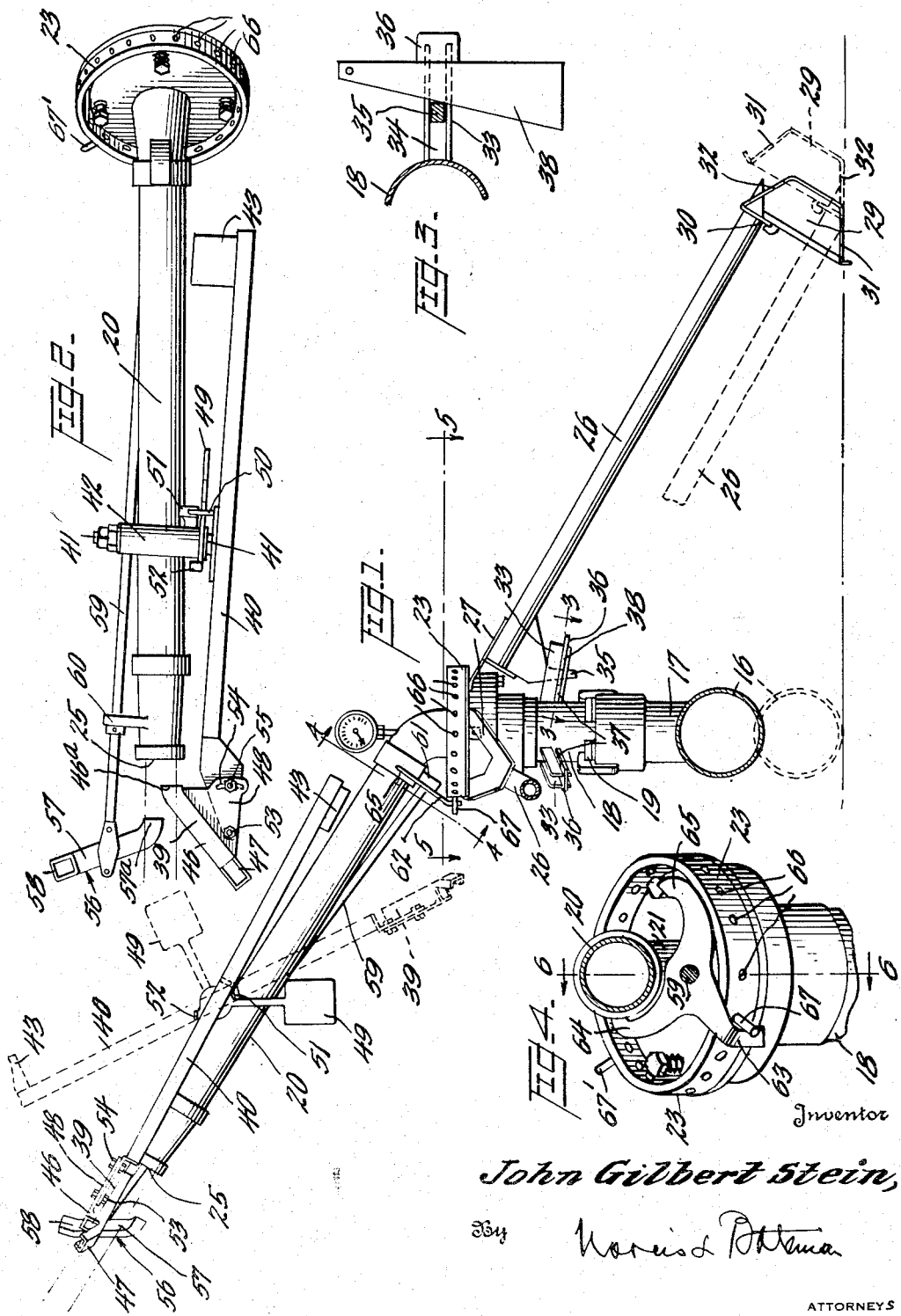
Inventor
John Gilbert Stein,
ATTORNEYS

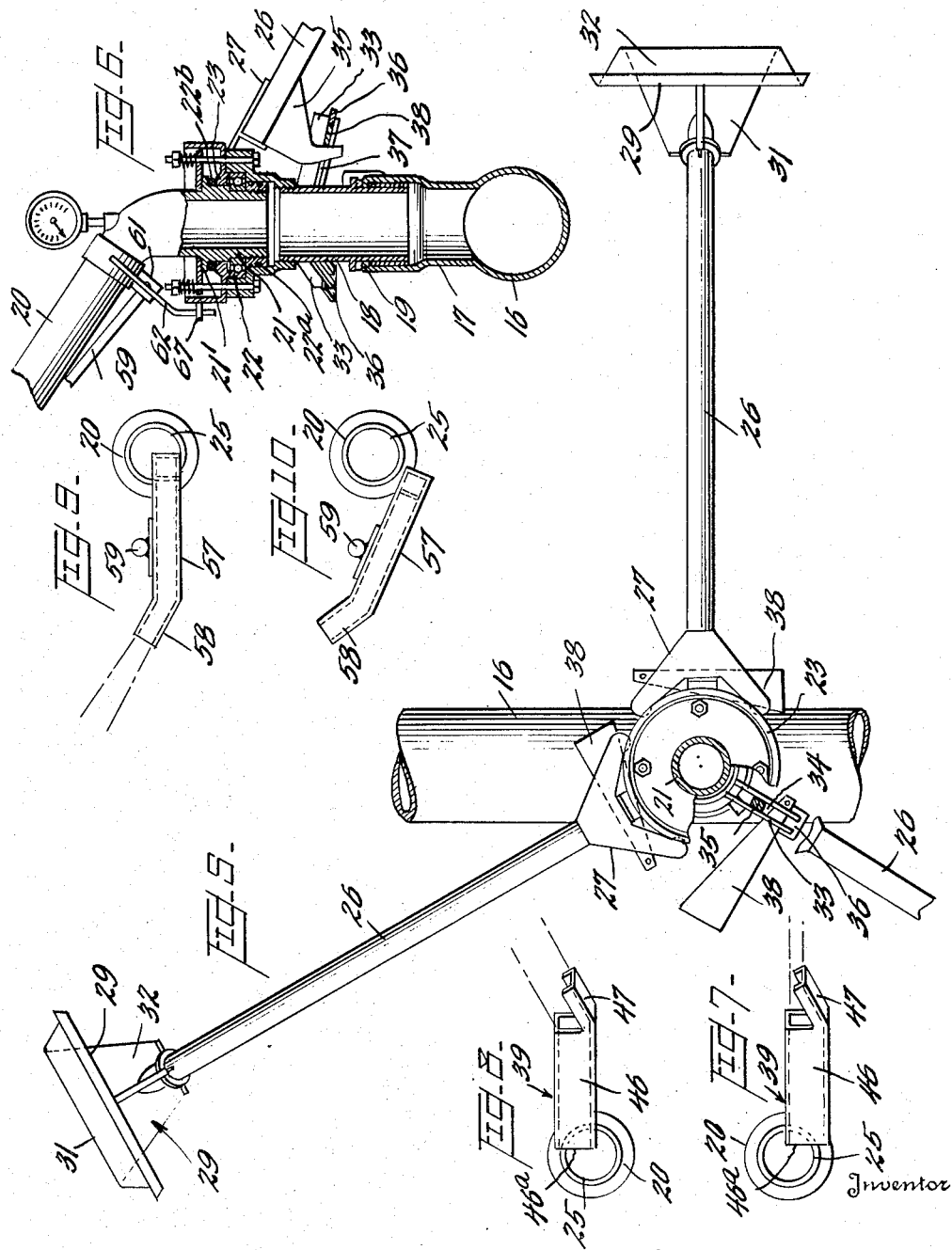

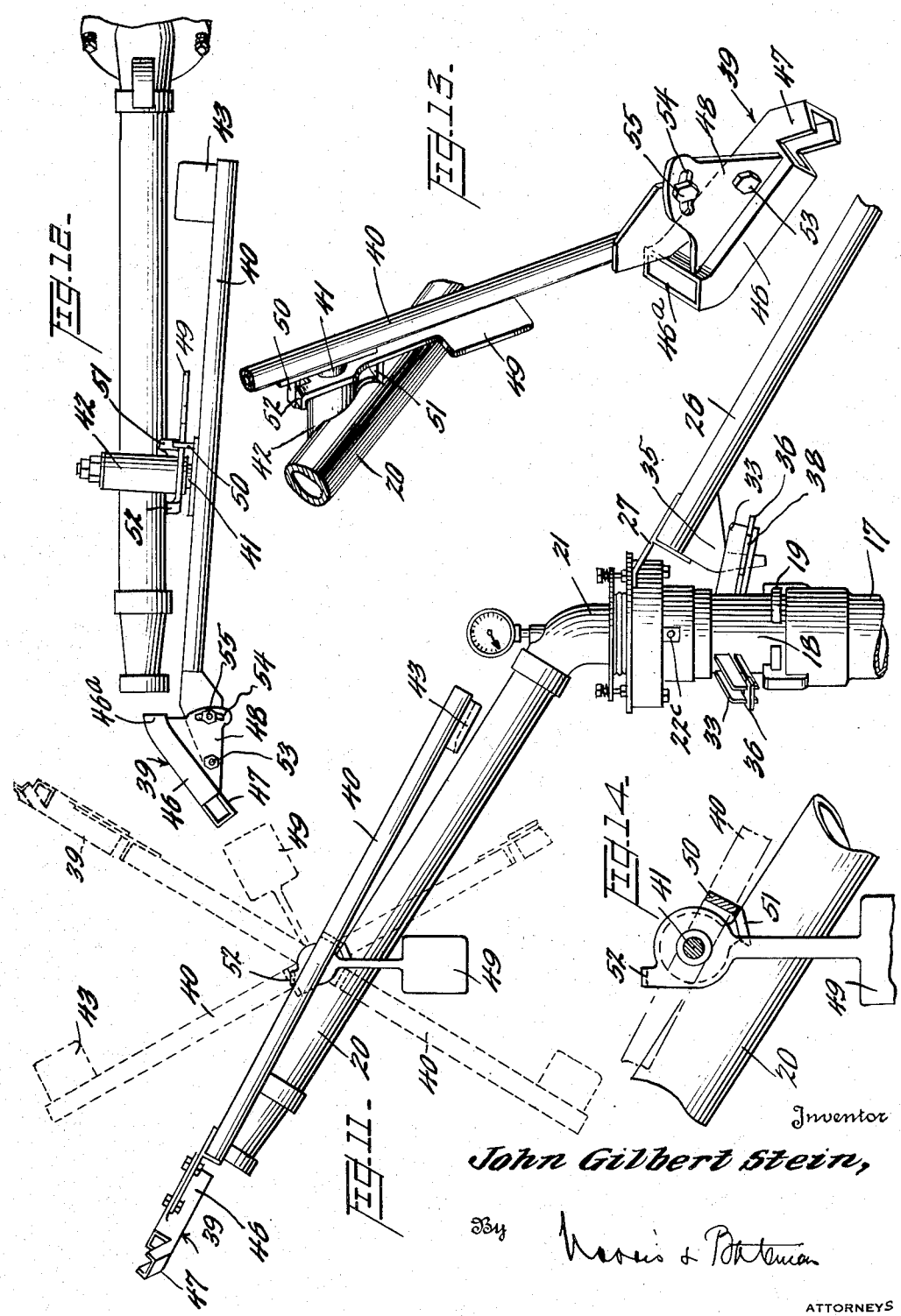

Patented Aug. 18, 1953

2,649,268

UNITED STATES PATENT OFFICE 2,649,268

TRIPOD MOUNTING

John Gilbert Stein, Chattanooga, Tenn.

Application March 4, 1949, Serial No. 79,709

9 Claims. (Cl. 248—83)

1

The present invention relates to a mounting adapted to be used for supporting any light or heavy equipment or other structure.

One of the objects of the invention is to provide a novel and improved mounting of the character referred to which is demountable for transportation, and which can be set up and dismantled without requiring the use of tools, or bolts or similar fastening devices.

Another object is to provide a tripod mounting of this character which enables the structure to be supported to be levelled on uneven ground or other surface before the structure is lifted from the ground or other support, and the weight of the structure to be subsequently transferred to tripod legs and supported thereby without disturbing the levelling of the structure.

Another object is to provide a tripod mounting of this character which may be applied with facility to the structure to be supported and levelled, and having legs which enable the structure to be levelled, after which the structure is raised to a desired or operative position by lifting one leg at a time, thereby enabling the structure to be lifted with less effort than would be required if the structure were lifted bodily at one operation, the legs having feet which are movable, as each leg is lifted, into position to support the structure in raised and levelled position.

Another object is to provide a tripod mounting of the character referred to which provides a rigid but adjustable central connection of the legs to the structure to be supported to resist torque tending to rotate the structure.

Another object is to provide a tripod mounting of the character referred to which provides great stability from overturning.

Another object of the invention is to provide a novel and improved mounting for an irrigating apparatus of the type having a nozzle rotatable about a vertical axis, which is demountable for convenience in transporting it from one location to another.

A further object of the invention is to provide a novel and improved mounting for an irrigating apparatus of the type having a nozzle rotatable about a vertical axis for projecting a stream of water over a wide area which may be readily adjusted or levelled to accommodate it to uneven terrain and thereby ensure rotation of the nozzle on an axis which is vertical or substantially so.

In the accompanying drawings:

Figure 1 is an elevation of an irrigation apparatus to which the mounting according to the present invention is applied, two of the legs of the mounting being omitted.

2

Figure 2 is a detail view of the nozzle and its associated parts on an enlarged scale.

Figure 3 is a detail section on an enlarged scale taken on the line 3—3 in Fig. 1.

Figure 4 is a detail section taken on the line 4—4 in Fig. 1.

Figure 5 is a horizontal section taken on the line 5—5 in Fig. 1, showing the positioning of the legs of the mounting.

Figure 6 is a vertical section taken on the line 6—6 in Fig. 4.

Figure 7 is an end view looking toward the nozzle orifice, showing the position of the reaction element which rotates the nozzle in one direction as it enters the stream from the nozzle.

Figure 8 is a view similar to Fig. 7 but showing the position of the same reaction element as it starts to reverse its direction of motion to move out of the stream from the nozzle.

Figure 9 is an end view of the nozzle orifice showing the position of the other reaction element while it is in the path of the stream from the nozzle and acting to reverse the direction of rotation of the nozzle.

Figure 10 is a view similar to Fig. 9 but showing the reverse reaction element in inoperative position.

Figure 11 is an elevation of the irrigation apparatus employing means for effecting step-by-step rotation of the nozzle in one direction only.

Figure 12 is a detail view of the nozzle and its associated parts as shown in Fig. 11.

Figure 13 is an enlarged perspective view of portions of the nozzle and of the associated swinging arm for timing operation of the reaction elements and thereby determining the intervals between the successive step-by-step movements imparted to the nozzle.

Figure 14 is a view on an enlarged scale, showing in detail the driving means between the swinging arm and the pendulum weight, and the cooperative stop.

Similar parts are designated by the same reference characters in the several views.

Referring to the drawings in detail, which illustrate the invention as applied to irrigating apparatus, reference numeral 16 designated a main water supply conduit leading from a pump or other source of water supply at high pressure, and having an upstanding branch conduit 17 connected to a central member, shown in the form of a cylindrical barrel 18 to which it may be detachably secured as by a conventional bayonet joint 19. The nozzle 20 is provided with a vertical tubular stem 21 which is mounted to rotate freely in the barrel 18 by a radial and thrust bearing 22, the stem having a circumferential groove in which a rubber sealing ring 22a is fitted, and an elastic rubber sealing ring 22b is stretched over the stem and fits between a flange 21' on the nozzle stem and the upper edge of an opening in a thrust ring 23 which surrounds and is bolted to the upper end of the barrel. The sealing ring 22a excludes water from the bearing 22 and the sealing ring 22b permits excess lubricant injected into the bearing through a fitting 22c to escape while excluding dust or water from the bearing from the exterior.

The body of the nozzle has an orifice 25 through which the stream of water for irrigation is discharged, the axis of the nozzle being inclined at a suitable angle to its substantially vertical axis of rotation to project the stream for a suitable distance, an angle of substantially 32 degrees to the horizontal being preferable in order to project the stream the maximum distance and for uniform distribution of the water.

Due to the reaction force produced axially of the nozzle by the discharge of water therefrom at high pressure, means are provided to support the nozzle with stability to prevent overturning, and to also permit easy levelling of the nozzle and its mounting notwithstanding unevenness of the surface of the terrain on which it rests. The present invention provides a novel mounting which comprises preferably three detachable legs 26 each of which is provided at one end with a fork 27 adapted to bear against a side of the barrel 18 beneath the thrust ring 23. The other end of each leg is provided with an adjustable foot 29 which is eccentrically pivoted for rotation on the leg at 30 to provide two alternative ground engaging surfaces 31 and 32 of different radii from the longitudinal axis of the leg. In order to position the legs 26 with their bearing elements 27 fulcrumed against the barrel 18, radial sockets or spiders 33 project outwardly and rigidly from three sides of the barrel and are provided with slots 34 which may receive blade-like hooks 35 which are fixed rigidly to and project downwardly from the inner ends of the legs and sustain torque tending to rotate the central member 18 relatively to the legs. Each spider is provided at its outer end with an abutment 36 which is fixed thereto, and is also provided with a transverse slot 37 which intersects the slot 34 to receive a wedge 38, one side of the wedge to bear against the abutment, and which may be pushed into the transverse slot until its other side bears against the hook 35 to limit relative upward swing of the leg relatively to the barrel 18.

The tripod mounting thus provided enables the entire irrigating device to be moved to any desired location in a "knocked-down" condition in which the separate parts may be handled easily by one person. Upon arrival at the desired location, the barrel 18 may be attached to the branch conduit 17 while the main water supply conduit 16 is resting on the ground, as shown by the dotted lines in Fig. 1. The legs 26 may then be placed with their forks 27 against the respective three sides of the barrel beneath the thrust ring 23, hooks 35 engaged in the slots 34 of the spiders 33, and the feet 29 positioned so that the surfaces 32 thereof of the relatively shorter radius are in contact with the ground, and the barrel is adjusted to vertical position, and while the barrel is held in such position the wedges 38 are pushed into the spaces between the respective abutments 36 and hooks 35. Due to unevenness of the surface of the ground upon which the apparatus is placed, the wedges will enter the respective slots 34 to different extents according to the different elevations occupied by the feet on the outer ends of the respective legs. After the wedges have been so adjusted, the apparatus, including the barrel and nozzle, is elevated by lifting each of the legs one at a time at its outer end and turning the feet 29 so that the surfaces 31 of the relatively longer radius rest on the ground, as shown by the full lines in Fig. 1. This operation elevates each of the legs an equal amount without changing its angular relation to the barrel 18, so that the barrel, branch conduit 17 and adjacent portions of the main water supply conduit 16 will then be elevated from the ground without disturbing the adjustments of the legs for supporting the nozzle for rotation on a vertical axis. The additional weight of the main water supply conduit 16 and the water contained therein is thereby added to that of the apparatus to stabilize it and enable it to resist the reaction from the nozzle tending to overturn it.

Rotation is imparted to the nozzle 20 by reaction produced by lateral diversion of a portion of the stream discharging from the nozzle. As shown in the present instance, step-by-step rotation is imparted to the nozzle in a clockwise direction, as viewed from above, by a vane or equivalent reaction element 39 which is mounted for movement into and out of the path of the stream discharging from the nozzle orifice. This reaction element is mounted on a swinging arm 40 which is pivotally mounted intermediately its ends by a pivot pin 41 fixed to this arm and rotating in a bearing 42 fixed to the nozzle, the axis of the pin 41 being horizontal and transverse to the axis of discharge of the nozzle. The opposite end of the arm 40 carries a paddle or vane 43 which is at substantially the same distance from the pivot pin 41 as the reaction element 39, and this end of the arm 40 overbalances its other end to which the reaction element 39 is attached. While the apparatus is not in operation and no water is discharging from the nozzle, a lug 50 fixed on the arm 40 rests against a stop 51 fixed to the body of the nozzle, thereby positioning the reaction element 39 for action thereon by a stream from the nozzle to start the apparatus into operation.

The action of a stream of water from the nozzle on the reaction element 39 is to displace the reaction element from the stream in a direction laterally of the axis of the nozzle, and to also swing the arm 40 downwardly or in a counter-clockwise direction as viewed in Fig. 1, but because of the overbalance of the end of the arm carrying the paddle 43, the normal tendency of the arm is to return the reaction element 39 to the stream from the nozzle. When the arm 40 has been swung through substantially a half-revolution in a counter-clockwise direction under the impulse received from the reaction element, the paddle 43 enters the stream from the nozzle, and the reaction of the stream on the paddle brings the arm 40 to a water-cushioned stop. As the reaction element returns to the nozzle stream, as shown by the full lines in Fig. 1, the action of the stream thereon will cushion and gently arrest the return swing of the arm 40.

Preferably and as shown in the present instance, the reaction element 39 is of hollow or tubular formation comprising walls 46 the lower one of which terminates in an upturned end 47. This element is mounted on a supporting plate 48 so that it extends angularly from the axis of discharge of the nozzle, and when the reaction element lies in the path of the stream from the nozzle, as shown in Fig. 8, a portion of the stream will be diverted first laterally by the body of the tubular structure of the reaction element and then upwardly by the upturned end thereof. The portion of the stream diverted laterally by the reaction element will produce a reaction laterally of the axis of the nozzle, and this reaction will be transmitted through plate 48, arm 40 and pivotal supporting means 41, 42 to the nozzle to rotate the latter on its vertical axis in a clockwise direction, as viewed from above. In addition, the upward diversion of water from the stream by the upturned end 47 of the reaction element will produce a downward reaction on the reaction element transverse to the reaction produced thereon by the laterally diverted portion of the stream to move the reaction element downwardly and to turn arm 40 in a counter-clockwise direction as viewed in Fig. 1, in opposition to, and overcoming the overbalancing weight of the end of the arm which carries the paddle 43.

As soon as the reaction element 39 is moved out of the stream by the downward reaction thereon, this reaction ceases to act on said element, but inertia causes the arm 40 to continue its rotation in the counter-clockwise direction. In order to control the operation of the arm under the impulse it receives from the reaction element and to assist in returning the reaction element 39 to the stream from the nozzle, loading means, preferably in the form of a pendulum weight 49, is provided.

The pendulum weight 49 is pivotally suspended on the pivot pin 41 to swing thereon, and is provided with a lug 52 which is engageable by the lug 50 fixed to the arm 40. While the apparatus is at rest and no water is discharging from the nozzle, the lug 50 rests against the stop 51 fixed to the nozzle, the reaction device 39 being thereby positioned for action thereon by a stream from the nozzle, and the lug 52 on the pendulum weight is spaced from the lug 50. After the arm 40 has rotated through approximately the first half of its rotation under the impulse received from the reaction element 39, the lug 52 on the pendulum weight is engaged by the lug 50, thereby causing the pendulum weight to be picked up by said arm, and as this arm continues its rotation under said impulse, the pendulum weight is swung upwardly from the full line to the dotted line position in Fig. 1, thus retarding the swing of the arm 40, and as the paddle 43 enters the stream from the nozzle, this swing of said arm will be gently arrested. Since the weight of the pendulum is added to the arm 40 as the reaction element 39 passes the mid-point in its swing away from the stream, the arm will always return in a clockwise direction to the position shown in full lines in Fig. 1, thereby returning the reaction element 39 to the stream to receive another reaction impulse therefrom.

The magnitude of the reaction produced on the reaction element 39 by the stream discharging from the nozzle can be controlled by adjusting the position of said element relatively to the nozzle orifice to thereby vary the force of the reaction of the stream thereon. For this purpose, the plate 48 carrying the reaction element is preferably pivoted at 53 to the arm 40 and arcuately slotted at 54 to receive a clamping screw 55. Since the pivot 53 of the reaction element is thus located forwardly of the point of initial impingement of the stream upon the leading edge 46a of the reaction element, adjustment of the reaction element about the pivot 53 will adjust the leading edge of this element transversely of the stream from the nozzle and thereby divert more or less of the stream laterally and thus impart more or less lateral reaction to said element in a direction to rotate the nozzle in a clockwise direction as viewed from above.

In order to irrigate only a sector or segment of a circle, means is provided for automatically reversing the rotation of the nozzle by a continuous motion in a counter-clockwise direction (as viewed from above) after having rotated step-by-step in the other direction, by reaction produced by lateral diversion of a portion of the stream from the nozzle orifice. Such reversing means comprises in the present instance a reaction element or vane 56 which is preferably in the form of a hollow or tubular member 57 having an upturned end 58, this element being positioned by a shaft 59 for movement into and out of the stream from the nozzle, this shaft being fixed to this reaction element and mounted rotatively in bearings 60 and 61 fixed on the nozzle. The weight of the various parts connected to this shaft is so distributed that the reaction element 56 will remain balanced in inoperative position while out of the stream from the nozzle. A yoke having a depending lug 63 and spaced stop arms 64 and 65 thereon, is fixed to the lower end of the shaft 59, and the thrust ring 23 fixed to the barrel 18 is provided with a plurality of circumferentially spaced openings 66 for the reception selectively of stop pins 67 and 67' which may be inserted in any two of these openings at any desired distance apart circumferentially according to the angle of the area to be irrigated, for engagement with the depending lug 63.

When the nozzle is advanced step-by-step in a clockwise direction, the reaction element 56 will occupy the inoperative position shown in Fig. 10, and there will be no rotation of shaft 59 until lug 63 engages pin 67', whereupon the shaft 59 will be rotated until stop arm 65 engages the side of the nozzle, in consequence of which the reaction element 56 will be moved into the path of the stream from the orifice of the nozzle, as shown in detail in Fig. 9. Rotation of the head in a reverse or counter-clockwise direction will then be produced until the lug 63 engages the other stop pin 67, the reaction element 56 then being in position to receive a portion of the stream from the nozzle orifice and to divert it laterally, thereby producing a reaction on the nozzle acting to rotate it in a reverse or counter-clockwise direction as viewed from above. While the reaction element 56 is in such operative position, its upturned end 58 is acted upon by the laterally diverted portion of the stream and produces a reaction in a direction to firmly hold the leading edge 57a of this reaction element in the stream from the nozzle. The reaction element 56 is thereby maintained in operative position until the lug 63 abuts against the pin 67. The shaft 59 will then be rotated in a direction to remove this reaction element from the stream, and the step-by-step rotation of the nozzle in the opposite direction is then resumed.

It will be evident that while the stream discharges from the nozzle, a series of successive reaction impulses are produced due to the action of the stream on the reaction element 39 while it is in the stream from the nozzle and that these impulses act to rotate the nozzle step-by-step in a clockwise direction. These successive impulses continue as long as the stream discharges from the nozzle, and they are independent of the reaction force which acts to reverse the rotation of the nozzle. This reversal takes place whenever reaction element 56 is moved into the path of the stream from the nozzle due to the interaction of the fixed stop pin 67' on the barrel 18 and the lug 63 which swings about the vertical axis of rotation of the nozzle as the latter reaches the limit of its rotation through the angle for which the stop pins 67 and 67' are set. The nozzle will thereby be adjusted to automatically rotate step-by-step in one direction and to rotate continuously in the reverse direction, thus enabling the nozzle to irrigate an area included by any desired angle for which the stop pins are set.

If it is desired to irrigate an area covering a complete circle, it is only necessary to dispense with the use of the stop pins 67 and 67', in which case the nozzle will rotate step-by-step through a complete revolution; or the reversing means may be omitted, as shown in Figs. 11 and 12, the construction and mode of operation in this embodiment of the invention being otherwise the same as described respecting Figs. 1 and 10 inclusive.

The adjustment of the reaction element 39 relatively to the stream from the nozzle enables the speed of operation of the arm 40 to be varied, it enabling relatively slow and gentle movements to be imparted thereto to rotate the nozzle with ample time allowed between the step-by-step rotative movements thereof to enable the stream to be projected to the maximum distance during the dwells between such movements.

By providing means for effecting the rotative movements of the nozzle solely by reaction produced by diversion of the stream from the nozzle, the operation takes place without jar or shock and, moreover, the structure is simplified. Such water as is diverted from the main stream to produce the reaction to rotate the nozzle is utilized to irrigate areas within a shorter radius from the nozzle than the more distant areas reached by the main stream projected directly from the nozzle.

The stop 51 performs the dual function of positioning the reaction element 39 for operation by a stream of water from the nozzle while the apparatus is at rest, thus rendering the apparatus self-starting when water is supplied to the nozzle, and of preventing swinging of the arm 40 accidentally beyond its extreme operative positions, as might occur otherwise, during adjustment of said reaction element, although during the normal operation of the apparatus, said arm is stopped at the ends of its swing in each direction by the stream from the nozzle.

The tripod mounting when employed for levelling and supporting the nozzle of irrigating apparatus, not only enables the nozzle and its associated parts to be easily and readily assembled and disassembled and transported from one location to another, but it enables the nozzle to be readily levelled on the ground, although the ground may be uneven, so that the nozzle will rotate on an axis which is vertical, or substantially so, and will be able to project a stream of water evenly and to the maximum distance over an area, which is particularly advantageous while the nozzle is employed to rotate through a complete revolution to irrigate a circular area.

It will be appreciated that the tripod mounting provided by the present invention may be used for supporting and levelling various other structures, such as either light or heavy equipment requiring a stable support and levelling, in which use the sockets 33 and associated leg attaching and adjusting means may be provided on the structure to be supported and levelled. Since the structure to be supported by the legs may be raised by lifting the outer ends of the legs one at a time, the lifting operation is facilitated as only one-third of the weight of the structure is required to be lifted by each leg lifting operation.

I claim:

1. A mounting for irrigation apparatus of the type having a nozzle rotatable on a substantially vertical axis and disposed to project a stream of water laterally from such axis, comprising a barrel in which the nozzle is mounted rotatably, a set of legs having portions engageable with the respective sides of the barrel at variable angular inclinations therewith and having feet on their outer ends mounted eccentrically for rotation about the longitudinal axes of the respective legs, each of said feet having a pair of ground engaging surfaces of relatively different eccentricities for engagement with the ground, and means on the barrel and cooperative with the inner ends of the legs for fixing the legs at the variable angular inclinations which they assume relatively to the barrel while the latter is in upright position and the ground engaging surfaces of one or the other eccentricity on the feet on the outer ends of the legs rest on the ground.

2. A mounting for irrigation apparatus of the type comprising a nozzle rotatable on a substantially vertical axis and disposed to project a stream of water laterally from such axis, comprising a barrel in which the nozzle is mounted for rotation and having radially slotted spiders extending therefrom, a set of legs having hook portions at their inner ends engageable in the slots in the respective spiders and having portions above said hook portions to abut against the respective sides of the barrel while the outer ends of the legs rest on the ground and the legs extend at variable angles of inclination from the barrel, and means engageable with said hooked portions to fix the respective legs at the variable angular inclinations with the barrel which they assume while the barrel is in upright position and the outer ends of the legs rest on the ground.

3. A mounting for irrigation apparatus as defined in claim 2, including feet rotatably mounted eccentrically on the outer ends of the respective legs to swing about the longitudinal axes of the legs as centers into positions for supporting the apparatus in elevated position on said feet.

4. A mounting for irrigation apparatus of the type comprising a nozzle rotatable on a substantially vertical axis and disposed to project a stream of water laterally from such axis, and a main water supply line for such nozzle, comprising a barrel having means for connection to the supply line and having the nozzle mounted rotatably therein, and provided with radially extending slotted members, a set of legs having lugs on their inner ends engageable in the slots in the respective slotted members and feet mounted eccentrically on their outer ends, the inner ends of the legs having forks to abut against the respective sides of the barrel, and wedges cooperative with the lugs on the legs and with said slotted portions on the barrel for fixing the legs in the angular relations with the barrel which they assume while the barrel is upright and the feet on the outer ends of the legs rest with their portions of shorter radius on the ground, said feet being rotatable to bring their portions of longer radius into engagement with the ground to thereby support the barrel and nozzle and the water supply line in elevated position above the ground.

5. A tripod mounting comprising an upright central member, a set of legs to incline downwardly and extend outwardly from different sides of the central member at variable angles of inclination, feet rotatably mounted eccentrically on the outer ends of the legs to swing about the longitudinal axes thereof as centers and providing on each of said feet a pair of support engaging surfaces of relatively different eccentricities for engagement with a supporting surface, and means on the central member cooperative with the inner ends of the legs to fix the legs rigidly at definite angles of inclination while the central member is upright and supported independently of the legs and the feet on the legs are rotated into one position to bring the support engaging surfaces of the lesser eccentricity to rest on the supporting surface, and for supporting the central member by the legs in said upright position and in an elevated position when the feet on the legs are rotated into another position to bring the support engaging surfaces of greater eccentricity to rest on the supporting surface.

6. A tripod mounting comprising a central member having sockets extending laterally in angular relation therefrom, a set of legs to extend in different radial relation and inclined at variable angles downwardly from the central member and having attaching means at their inner ends to cooperate with the respective sockets on the central member, feet each having a pair of support engaging surfaces of relatively different eccentricities thereon and rotatably mounted eccentrically on the outer ends of the legs and swingable about the longitudinal axes of the legs as centers and engageable with a supporting surface, and means between the central member and the legs for fixing the legs rigidly in variable inclined relation with the central member.

7. A tripod mounting as defined in claim 6, wherein said attaching means comprises a fork on each leg to engage the respective side of said central member and a hook fixed to each leg adjacent to its inner end, and said means for fixing the legs in variable inclined relations to said central member comprises a wedge supported by each of said sockets and cooperative with the hook on the respective leg.

8. A tripod mounting comprising a central member having radial sockets fixed thereto and extending angularly from different sides thereof, a set of legs to extend radially and incline downwardly from the different sides of the central member, the inner ends of the legs each having a fork thereon to abut against the respective side of the central member above the respective socket and a hook below the fork to engage in the respective socket, a foot rotatably mounted eccentrically on the outer end of each leg, and a wedge mounted adjustably in each socket and engageable with the hook on the respective leg to fix the leg at a definite angle of inclination relatively to the central member.

9. A tripod mounting as defined in claim 8, wherein each of said sockets has a vertical slot therein, and each of said hooks is blade-like and engages in the slot in the respective socket to prevent rotation of said central member relatively to the legs.

JOHN GILBERT STEIN.

References Cited in the file of this patent

UNITED STATES PATENTS

| Number | Name | Date |
| --- | --- | --- |
| 752,423 | Smith | Feb. 16, 1904 |
| 1,506,442 | O'Hara | Aug. 26, 1924 |
| 1,590,910 | Rumrill | June 29, 1926 |
| 1,650,747 | Thalhammer | Nov. 29, 1927 |
| 1,751,879 | Orr | Mar. 25, 1930 |
| 1,811,171 | Buckner | June 23, 1931 |
| 1,906,380 | Johnson | May 2, 1933 |
| 2,171,870 | Swartz | Sept. 5, 1939 |